US012294258B2

(12) United States Patent
Xu et al.

(10) Patent No.: US 12,294,258 B2
(45) Date of Patent: May 6, 2025

(54) MULTI-EXCITATION-SOURCE AXIAL-FLUX PERMANENT-MAGNET MOTOR WITH PARTITIONED, HIERARCHICAL, AND VARIABLE POLES, AND VARIABLE-CONDITION DRIVING CONTROL SYSTEM

(71) Applicant: Jiangsu University, Jiangsu (CN)

(72) Inventors: Lei Xu, Jiangsu (CN); Danchen Xu, Jiangsu (CN); Chao Zhang, Jiangsu (CN); Xiaohua Zang, Jiangsu (CN); Xiaoyong Zhu, Jiangsu (CN); Li Quan, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/575,333

(22) PCT Filed: May 6, 2023

(86) PCT No.: PCT/CN2023/092499
§ 371 (c)(1),
(2) Date: Dec. 29, 2023

(87) PCT Pub. No.: WO2024/174385
PCT Pub. Date: Aug. 29, 2024

(65) Prior Publication Data
US 2025/0079959 A1    Mar. 6, 2025

(30) Foreign Application Priority Data
Feb. 24, 2023    (CN) .......................... 202310161787.9

(51) Int. Cl.
*H02K 16/04* (2006.01)
*H02K 1/02* (2006.01)
(Continued)

(52) U.S. Cl.
CPC ............... *H02K 16/04* (2013.01); *H02K 1/02* (2013.01); *H02K 1/16* (2013.01); *H02K 1/2796* (2022.01);
(Continued)

(58) Field of Classification Search
CPC .... H02K 1/182; H02K 1/2713; H02K 1/2793; H02K 1/2795; H02K 1/2796; H02K 21/24; H02K 37/08; H02K 37/125
(Continued)

(56) References Cited

U.S. PATENT DOCUMENTS 11,018,536 B2 *    5/2021    Igwemezie .......... H02K 41/031
2018/0198332 A1 *    7/2018    Ueda ...................... H02K 16/00

FOREIGN PATENT DOCUMENTS

CN    107769502    3/2018
CN    108616203    10/2018
(Continued)

OTHER PUBLICATIONS

Jie Tian et al., "Analysis and Optimization of Torque Performance of Axial Flux Alternating Pole Permanent Magnet Motor", Mechanical and electrical information, with English abstract, Aug. 23, 2022, pp. 1-6.
(Continued)

*Primary Examiner* — Oluseye Iwarere
*Assistant Examiner* — Minki Chang
(74) *Attorney, Agent, or Firm* — JCIPRNET

(57) ABSTRACT

The present disclosure provides a multi-excitation-source axial-flux permanent-magnet motor with partitioned, hierarchical, and variable poles, and a variable-condition driving control system. The motor mainly includes a main magnetic pole and an auxiliary magnetic pole. The main magnetic pole is responsible for providing a main air gap flux and is connected in series with a dual-stator magnetic circuit. The
(Continued)

auxiliary magnetic pole is responsible for adjusting an air gap field and is connected in parallel with the dual-stator magnetic circuit. Magnetic fluxes of the main magnetic pole and the auxiliary magnetic pole together constitute the air gap field. The present disclosure can control a flux path of the auxiliary magnetic pole by controlling the magnitude of a current applied to a field winding, thereby adjusting an air gap flux, expanding a speed range of the motor, and achieving variable-condition operation of the motor.

10 Claims, 20 Drawing Sheets

(51) Int. Cl.
  *H02K 1/16* (2006.01)
  *H02K 1/2796* (2022.01)
  *H02K 1/32* (2006.01)
  *H02K 3/28* (2006.01)
  *H02K 11/33* (2016.01)

(52) U.S. Cl.
  CPC ............... *H02K 1/32* (2013.01); *H02K 3/28* (2013.01); *H02K 11/33* (2016.01); *H02K 2201/06* (2013.01); *H02K 2213/03* (2013.01); *H02K 2213/06* (2013.01)

(58) Field of Classification Search
  USPC .................................................. 310/156.32
  See application file for complete search history.

(56) References Cited

FOREIGN PATENT DOCUMENTS

| CN | 109217597 | 1/2019 |
|---|---|---|
| JP | 2015154587 | 8/2015 |
| WO | WO-2018122702 A1 * | 7/2018 |

OTHER PUBLICATIONS

"Written Opinion of the International Searching Authority (Form PCT/ISA/237) of PCT/CN2023/092499," mailed on Oct. 30, 2023, with English translation thereof, pp. 1-7.

* cited by examiner

MULTI-EXCITATION-SOURCE AXIAL-FLUX PERMANENT-MAGNET MOTOR WITH PARTITIONED, HIERARCHICAL, AND VARIABLE POLES, AND VARIABLE-CONDITION DRIVING CONTROL SYSTEM

CROSS-REFERENCE TO RELATED APPLICATION

This application is a 371 of international application of PCT application serial no. PCT/CN2023/092499, filed on Jun. 5, 2023, which claims the priority benefit of China application no. 202310161787.9, filed on Feb. 24, 2023. The entirety of each of the above mentioned patent applications is hereby incorporated by reference herein and made a part of this specification.

TECHNICAL FIELD

The present disclosure relates to an axial-flux permanent-magnet motor, in particular to a multi-excitation-source poles-partitioned dual-stator axial-flux controllable permanent-magnet motor and a driving control thereof, and belongs to the technical field of special motors.

BACKGROUND

As an important field of carbon neutrality, carbon peaking, and low-carbon economy, decarburization and green efficiency have become hot topics and focal points in the transportation industry. One of the important measures to effectively control carbon dioxide emissions of fuel vehicles is to significantly increase the proportion of new energy vehicles. The torque density, mechanical strength, speed ratio, noise, cost, efficiency, and control strategy difficulty of drive motors, the core of electric vehicle power systems, directly affect the performance of electric vehicles. Permanent-magnet motors have become the preferred ones for electric vehicles due to their advantages such as high torque density, high power factor, and high efficiency.

Permanent-magnet motors are divided into radial-flux permanent-magnet motors and axial-flux permanent-magnet motors according to their topology. As for axial-flux permanent-magnet motors, their stator and rotor are distributed in parallel along the axial direction of the motor, with a flat air gap and an air gap flux distributed along the axial direction of the motor and perpendicular to the stator and rotor. In recent years, many scholars at home and abroad have conducted in-depth research on the topology of axial-flux permanent-magnet motors, mainly aiming at high power density, high efficiency, strong flux adjustment ability, and high reliability. In order to improve the efficiency of axial-flux permanent-magnet motors, some scholars have proposed yokeless stator-partitioned axial-flux permanent-magnet motors, which can reduce the core loss and winding copper loss of the motor and improve the power density of the motor. For example, YASA, a British company, has developed P400R series yokeless axial-flux permanent-magnet motors with a power density of 5.7 kW/kg, and MagnaX, a Belgian company, has developed AXF185 series yokeless axial-flux permanent-magnet motors with a power density of 12.5 kw/kg. To further reduce the motor loss, some scholars have proposed a coreless axial-flux permanent-magnet motor, which includes only a centralized winding in the stator, avoiding the core loss and achieving higher motor efficiency. In addition, an amorphous alloy axial-flux permanent-magnet motor can significantly reduce the core loss and significantly improve the efficiency. To improve motor reliability, some scholars have proposed an asymmetric dual-three-phase axial-flux permanent-magnet motor, which improves fault tolerance.

Overall, axial-flux permanent-magnet motors feature a unique and compact topology, a higher torque/power density, and stronger and easier heat dissipation. In the field of electric vehicle drive motors, whether centralized or distributed, axial-flux permanent-magnet motors have more advantages in the pursuit of extreme space. Traditional axial-flux permanent-magnet motors adopt a shorter magnetic circuit, which can achieve a more significant flux concentration effect and a higher air gap flux density. However, for this reason, traditional axial-flux permanent-magnet motors have problems such as difficult flux weakening, narrow constant-power operating range, and limited speed range, making them hard to meet the requirements of electric vehicles for variable operating conditions and wide speed range. Chinese Patent ZL202011388266.X proposes a hybrid-excitation axial-flux permanent-magnet synchronous motor structure, and Chinese Patent ZL201310432668.9 proposes an axial-flux-switched surface-mounted permanent-magnet memory motor. They have problems such as limited flux adjustment range, low efficiency, and fatigue flux adjustment of flux-adjustable permanent magnets. Therefore, the targeted design and development of new structures for axial-flux permanent-magnet motors has important theoretical significance and economic value in effectively expanding the speed range and improving motor efficiency.

SUMMARY OF INVENTION

An objective of the present disclosure is to propose a multi-excitation-source poles-partitioned dual-stator axial-flux controllable permanent-magnet motor to solve the problems existing in traditional axial-flux permanent-magnet motors. The present disclosure is based on a variable reluctance and a controllable leakage flux to construct a unique poles-partitioned topology for the axial-flux permanent-magnet motor, mainly including a main magnetic pole and an auxiliary magnetic pole. The main magnetic pole is responsible for providing a main air gap flux and is connected in series with a dual-stator magnetic circuit. The auxiliary magnetic pole is responsible for adjusting an air gap field and is connected in parallel with the dual-stator magnetic circuit. Magnetic fluxes of the main magnetic pole and the auxiliary magnetic pole together constitute the air gap field. The present disclosure can control a flux path of the auxiliary magnetic pole by controlling the magnitude of a current applied to a field winding, thereby adjusting an air gap flux, expanding a speed range of the motor, and achieving variable-condition operation of the motor. In addition, the present disclosure can further reduce a torque ripple and improve a power density, thereby achieving high-efficiency and high-reliability operation of the motor and improving the dynamic operating performance of the motor.

The present disclosure adopts the following technical solutions. The multi-excitation-source poles-partitioned dual-stator axial-flux controllable permanent-magnet motor includes a first stator (1), a second stator (2), a first permanent magnet (3), a second permanent magnet (4), a third permanent magnet (5), a fourth permanent magnet (6), a first rotor yoke (7), a second rotor yoke (8), a first armature winding (9), a second armature winding (10), a first field winding (11), a second field winding (12), a first air gap (13), and a second air gap (14), where the first stator (1) and the second stator (2) are symmetrically provided outside the motor, with respective slots facing inward; the first armature winding (9) is wound on stator teeth of the first stator (1) in a distributed structure; the second armature winding (10) is wound on stator teeth of the second stator (2) in a distributed structure; the first field winding (11) is wound on the stator teeth of the first stator (1) in a centralized structure; the second field winding (12) is wound on the stator teeth of the second stator (2) in a centralized structure; the first rotor yoke (7) and the second rotor yoke (8) are symmetrically provided inside the motor, with respective slots facing inward; a plurality of fan-shaped slots are uniformly distributed inside the first rotor yoke (7) and each are provided therein with the third permanent magnet (5); a plurality of fan-shaped slots are uniformly distributed inside the second rotor yoke (8) and each are provided therein with the fourth permanent magnet (6); positions of the fan-shaped slots on the first rotor yoke (7) and the second rotor yoke (8) are completely symmetrical; the first permanent magnet (3) and the second permanent magnet (4) are provided between the first rotor yoke (7) and the second rotor yoke (8); the first permanent magnet (3) and the second permanent magnet (4) are spaced apart from each other and circumferentially staggered from the third permanent magnet (5) and the fourth permanent magnet (6); the first air gap (13) is provided between an inner side of the first stator (1) and an outer side of the first rotor yoke (7); the second air gap (14) is provided between an inner side of the second stator (2) and an outer side of the second rotor yoke (8); and an axis of the first stator (1) and the second stator (2) coincides with a rotational axis of the first rotor yoke (7) and the second rotor yoke (8).

Further, the first stator (1) and the second stator (2) each include a stator core formed by winding a silicon steel sheet circumferentially and the stator teeth formed in a part facing a rotor; the first rotor yoke (7) and the second rotor yoke (8) each include a rotor core formed by winding a silicon steel sheet circumferentially; and in a design of the multi-excitation-source poles-partitioned dual-stator axial-flux controllable permanent-magnet motor with high-speed operation, the rotor core of the first rotor yoke (7) and the rotor core of the second rotor yoke (8) are die-cast from a soft magnetic material.

Further, the first armature winding (9) and the second armature winding (10) are double-layer windings of a distributed structure, with a pitch of $\geq 360°/(2*p)$, where p denotes a number of rotor pole pairs;

the first field winding (11) and the second field winding (12) are single-layer windings with an interval of $120°*Z/(2*p)$, where Z denotes a number of stator slots; and 8 of the fan-shaped slots with a depth of 3 mm and a curvature of $0.285*360°/(2*p)$ are uniformly distributed inside the first rotor yoke (7), with a spacing of $(1-0.285)*360°/(2*p)$ between each two adjacent ones of the fan-shaped slots; and 8 of the fan-shaped slots with a depth of 3 mm and a curvature of $0.285*360°/(2*p)$ are uniformly distributed inside the second rotor yoke (8), with a spacing of $(1-0.285)*360°/(2*p)$ between each two adjacent ones of the fan-shaped slots.

Further, the first permanent magnet (3) and the second permanent magnet (4) each include p pole pairs distributed circumferentially and alternately in N and S; the first permanent magnet (3) and the second permanent magnet (4) are magnetized in opposite directions along an axial direction of the motor; the third permanent magnet (5) and the fourth permanent magnet (6) are magnetized in opposite directions along a tangential direction of the motor; a magnetic energy product of the first permanent magnet (3) and the second permanent magnet (4) is greater than a magnetic energy product of the third permanent magnet (5) and the fourth permanent magnet (6); and the first permanent magnet (3) and the second permanent magnet (4) are spaced $0.55*360°/(2*p)$ apart and circumferentially staggered by $0.1325*360°/(2*p)$ from the third permanent magnet (5) and the fourth permanent magnet (6); and a magnetic flux generated by the third permanent magnet (5) and the fourth permanent magnet (6) basically does not participate in an excitation of an air gap field in an unloaded state and participates in the excitation of the air gap field in a loaded state, thereby changing a magnetic flux of a main magnetic circuit of the motor and expanding a speed range of the motor; and when the third permanent magnet (5) and the fourth permanent magnet (6) are made of a ductile alnico material, a direct current excitation is applied through the first field winding (11) or the second field winding (12) to adjust the magnetic energy product of the third permanent magnet (5) and the fourth permanent magnet (6).

Further, a hollow heat dissipation hole is provided between rotor cores of the first rotor yoke (7) and the second rotor yoke (8) to reduce a rotor temperature and a risk of permanent magnet demagnetization by means of oil cooling and air cooling; and an arc-shaped groove with a depth of H≤3 mm is provided at a position axially opposite to the first permanent magnet (3) and the second permanent magnet (4) at an air gap side of the first rotor yoke (7) and the second rotor yoke (8), to adjust a magnetic flux of the first permanent magnet (3), the second permanent magnet (4), the third permanent magnet (5), and the fourth permanent magnet (6), and to reduce a cogging torque and an axial magnetic pull of the motor.

Further, when the first field winding (11) and the second field winding (12) fail, the first armature winding (9) and the second armature winding (10) operate independently without affecting normal operation of the motor; and when the first armature winding (9) and the second armature winding (10) fail, the first field winding (11) and the second field winding (12) replace the first armature winding (9) and the second armature winding (10) and are energized with a three-phase current to drive the motor to operate, thereby improving fault tolerance and operational reliability of the motor.

Further, the first stator (1) and the second stator (2) are staggered by a predetermined angle of $\alpha \leq 120°*Z/(2*p)$; and the angle is controllable to change a leakage flux and an air gap flux density of the motor, thereby changing an output torque and a power level of the motor.

The present disclosure further provides a variable-condition driving control system of the multi-excitation-source poles-partitioned dual-stator axial-flux controllable permanent-magnet motor, including a motor power converter composed of four H-bridges, where inlet and outlet terminals of the first field winding (11) and the second field winding (12) are respectively connected to center points of the H-bridges, and inlet and outlet terminals of the two armature windings on the first stator (1) and the second stator (2) are respectively connected to the center points of the H-bridges to form an open winding structure or a dual-three-phase structure; and the H-bridges of the first field winding (11) and the second field winding (12) are connected in series with an open winding structure busbar of three-phase windings.

Further, multi-mode operation is achieved; when neutral points of the two three-phase windings on the first stator (1)

and the second stator (2) are disconnected, the motor operates in the open winding structure; and when the neutral points of the two three-phase windings on the first stator (1) and the second stator (2) are connected, the motor operates in the dual-three-phase structure.

Further, the first field winding (11) and the second field winding (12) are controlled separately through one of the H-bridges; on-off of four switch transistors is controllable to control application of forward and backward excitation currents, thereby achieving magnetization and demagnetization of a magnetic field of the motor; and when the field windings fail, a control effect of a power converter of the armature windings is not affected.

In the present disclosure, the multi-excitation-source poles-partitioned dual-stator axial-flux controllable permanent-magnet motor includes two stators, a field winding, an armature winding, a main magnetic pole, an auxiliary magnetic pole, and two symmetrical-dual-yoke rotor cores. The two stators are symmetrically provided outside the motor, and stator teeth are wound with the field winding and the armature winding. A direct current is applied to the field winding, so the field winding is also known as a direct current winding. An alternating current is applied to the armature winding, so the armature winding is also known as an alternating current winding. The symmetrical-dual-yoke rotor cores are provided between the two stators and separated from the stators by an air gap. The main magnetic pole is provided between the two symmetrical-dual-yoke rotor cores and is alternately magnetized along an axial direction of the motor. The auxiliary magnetic pole is embedded into the two symmetrical-dual-yoke rotor cores and magnetized alternately along a tangential direction of the motor.

The present disclosure has the following advantages.

1. When the field winding is not operating, the magnetic flux of the auxiliary magnetic pole is basically not involved in the excitation of the air gap field. When the field winding is operating, the magnetic flux of the auxiliary magnetic pole enters the air gap and together with the magnetic flux of the main magnetic pole, forms the air gap field. Therefore, the present disclosure can adjust magnetic flux of the air gap field, thereby broadening the speed range of the motor.

2. The symmetrical dual-stator structure can balance the axial magnetic pull of the motor, improve the power density and operational reliability of the motor, and strengthen the heat dissipation ability of the motor.

3. Compared to traditional axial-flux permanent-magnet motors, in the present disclosure, the symmetrical-dual-yoke rotor structure achieves anti-saliency of the motor, such that the motor can utilize the reluctance torque, facilitating heavy-duty operation of the motor.

4. The main magnetic pole is provided between the symmetrical-dual-yoke rotor cores, and the hollow structure is easy to dissipate heat, making it convenient for the heat exchange medium to carry out the heat from the rotor.

5. The two stators are wound with the field winding and the armature winding. When the field winding fails, the armature winding can operate independently without affecting the normal operation of the motor. In addition, when the armature winding fails, the field winding can act as the armature winding to drive the motor to operate normally, improving the motor's fault tolerance and operational reliability.

6. The motor can operate with a predetermined angle Z ($\leq 120° *Z/(2*p)$) between the two stators, when the leakage flux and air gap flux density of the motor can be changed, thereby changing the output torque and power level of the motor.

DESCRIPTION OF EMBODIMENTS

As shown in FIGS. 1 to 4, the present disclosure provides a multi-excitation-source poles-partitioned dual-stator axial-flux controllable permanent-magnet motor. The permanent-magnet motor includes two stators, a field winding, an armature winding, a main magnetic pole, an auxiliary magnetic pole, and two symmetrical-dual-yoke rotor cores. The two stators are symmetrically provided outside the motor, and stator teeth are wound with the field winding and the armature winding. A direct current is applied to the field winding, so the field winding is also known as a direct current winding. An alternating current is applied to the armature winding, so the armature winding is also known as an alternating current winding. The symmetrical-dual-yoke rotor cores are provided between the two stators and separated from the stators by an air gap. The main magnetic pole is provided between the two symmetrical-dual-yoke rotor cores and is alternately magnetized along an axial direction of the motor. The auxiliary magnetic pole is embedded into the two symmetrical-dual-yoke rotor cores and magnetized alternately along a tangential direction of the motor.

Figure 1:
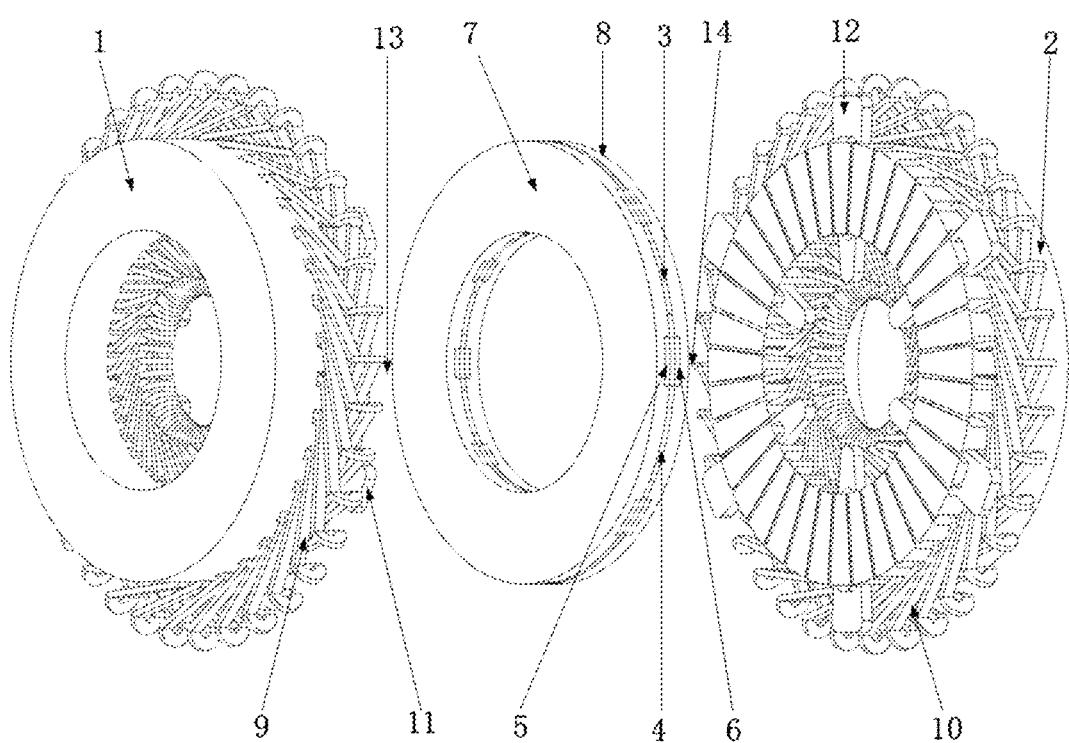
FIG. 1 is a three-dimensional exploded view of a dual-stator axial-flux permanent-magnet motor according to the present disclosure.
Figure 2:
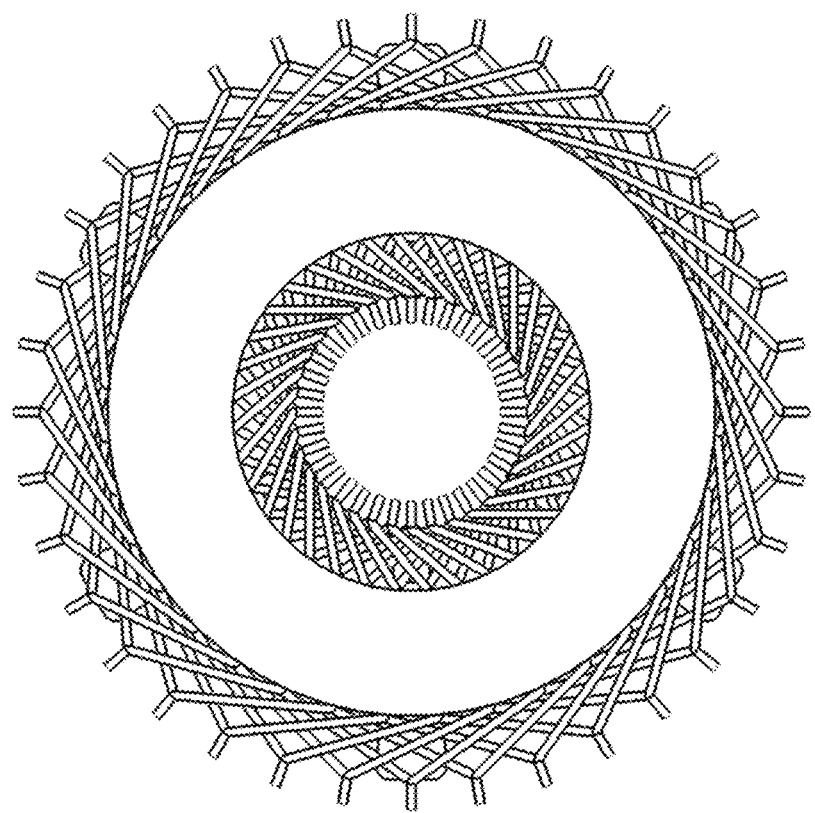
FIG. 2 is a three-dimensional front view of the dual-stator axial-flux permanent-magnet motor according to the present disclosure.
Figure 3:
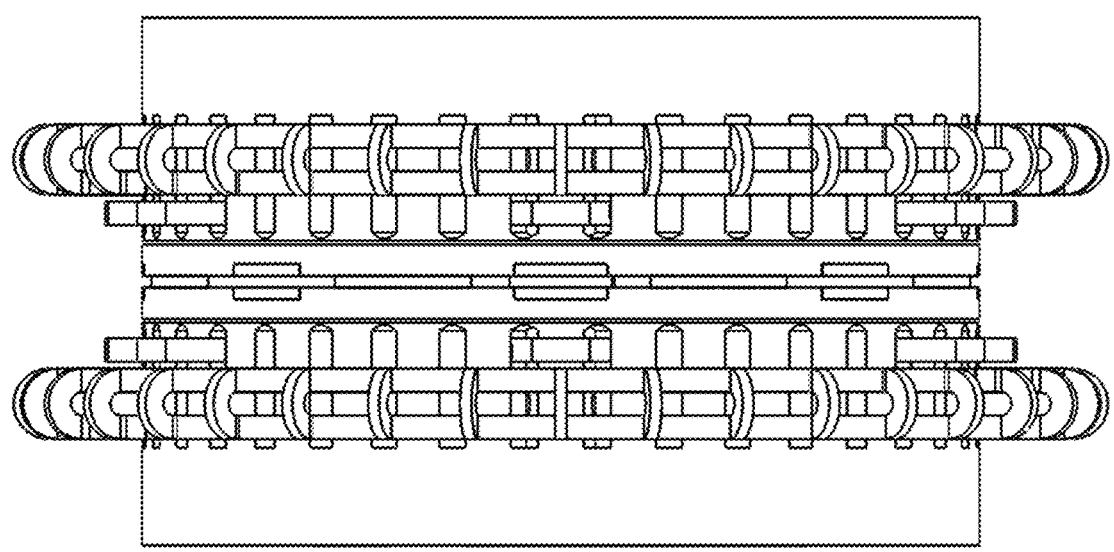
FIG. 3 is a three-dimensional top view of the dual-stator axial-flux permanent-magnet motor according to the present disclosure.
Figure 4:
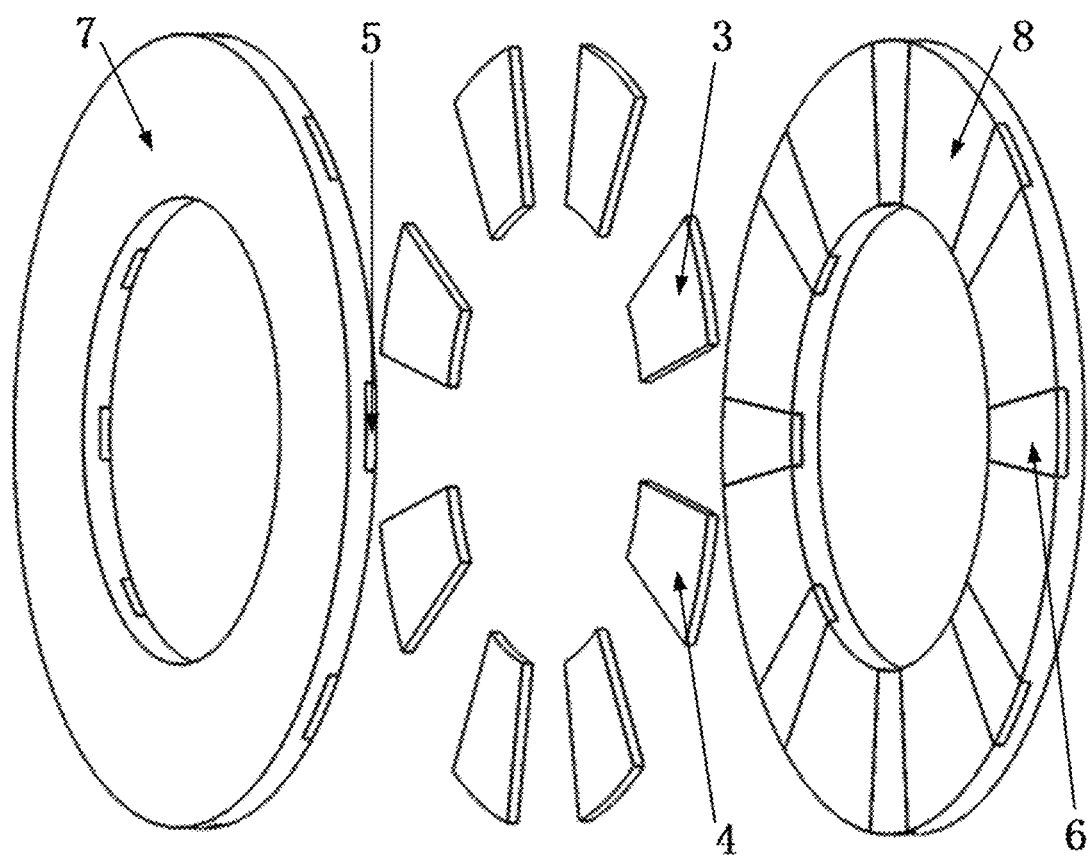
FIG. 4 is an exploded view of a rotor of the dual-stator axial-flux permanent-magnet motor according to the present disclosure.
Figure 5:
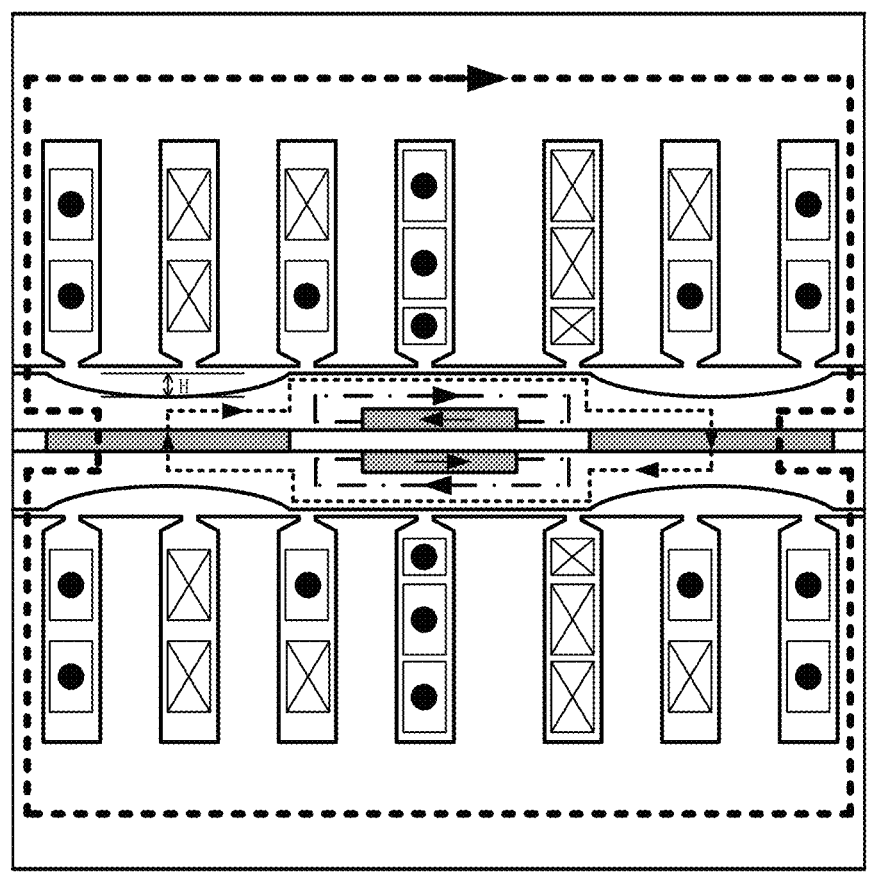
FIG. 5 is a distribution diagram of a magnetic path of the dual-stator axial-flux permanent-magnet motor when stators 1 and 2 operate and a field winding is not energized according to the present disclosure.

Case 1 is shown in FIG. 5. In this case, a first field winding (11) and a second field winding (12) are not energized, and a first permanent magnet (3) and a second permanent magnet (4) are magnetized in opposite directions along the axial direction of the motor. Magnetic paths of the first permanent magnet and the second permanent magnet include a majority closed through the two air gaps and the two stators and a minority closed through the yokes of the two rotors rather than the air gaps. A third permanent magnet (5) and a fourth permanent magnet (6) are magnetized in opposite directions along the tangential direction of the motor. A magnetic path of the third permanent magnet (5) is basically closed through a first rotor yoke 7, except for a very small part closed through a first air gap 13 and a first stator 1. A magnetic path of the fourth permanent magnet 6 is basically closed through a second rotor yoke 8, except for a very small part closed through a second air gap 14 and a second stator 2. The motor has a large leakage flux, which is conducive to light-load operation.

Figure 6:
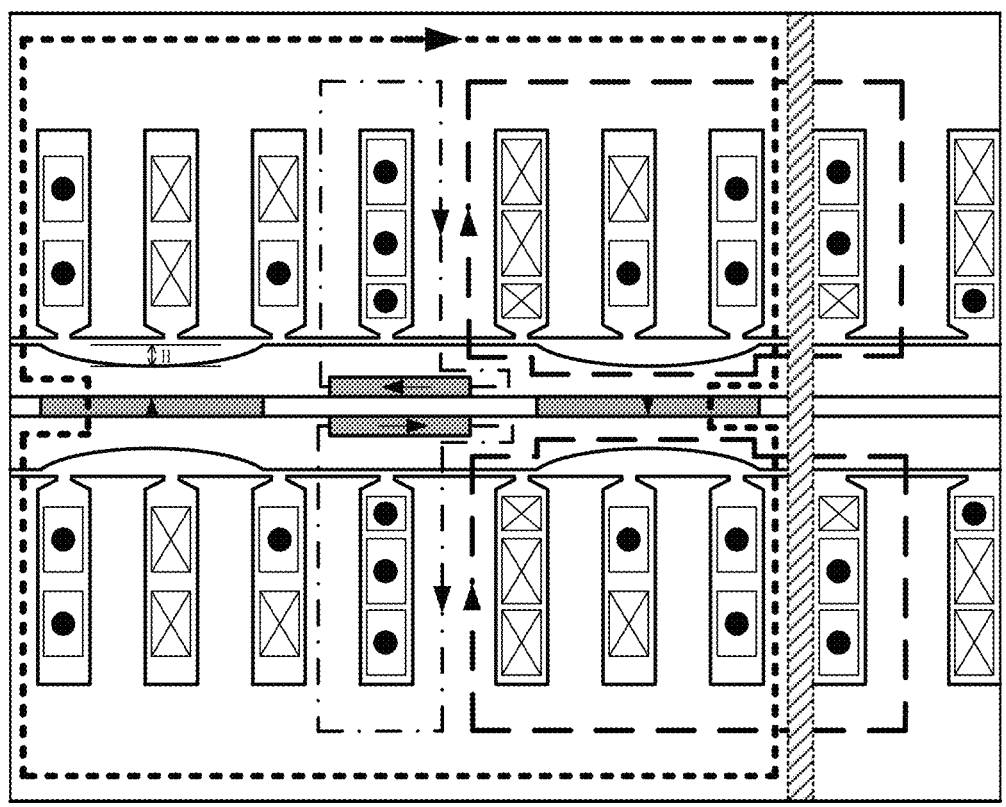
FIG. 6 is a distribution diagram of the magnetic path of the dual-stator axial-flux permanent-magnet motor when the stators 1 and 2 operate and the field winding is energized according to the present disclosure.

Case 2 is shown in FIG. 6. A difference between this case and Case 1 is as follows. The first field winding (11) and the second field winding (12) are energized with a forward current. The electric excitation magnetic path passes through a leakage magnetic circuit, causing the leakage magnetic circuit to gradually saturate. The magnetic paths of the first permanent magnet (3) and the second permanent magnet (4) are basically closed through the two air gaps and the two stators. The magnetic paths of the third permanent magnet (5) and the fourth permanent magnet (6) mostly transfer from the rotor yokes to the air gaps and stators. The magnetic path of the third permanent magnet 5 is basically closed through the first air gap 13 and the first stator 1, while the magnetic path of the fourth permanent magnet 6 is basically closed through the second air gap 14 and the second stator 2. The leakage flux of the motor is significantly reduced, and the torque output ability of the motor is enhanced, which is conducive to heavy-duty operation.

Figure 7:
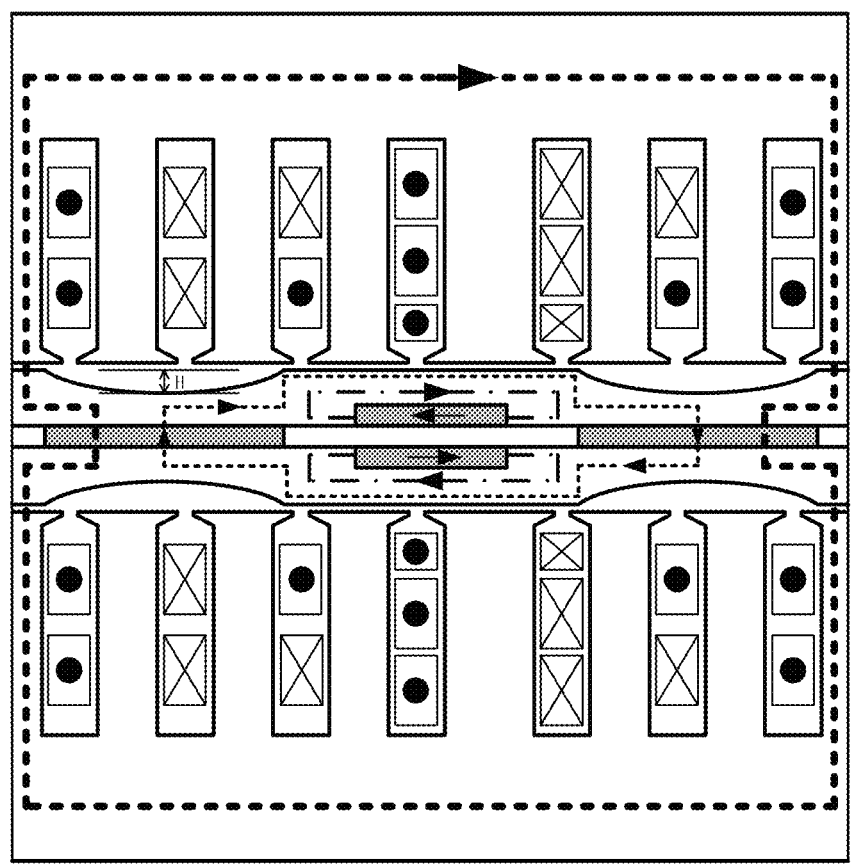
FIG. 7 is a distribution diagram of the magnetic path of the dual-stator axial-flux permanent-magnet motor when only the stator 1 operates and the field winding is not energized according to the present disclosure.

Case 3 is shown in FIG. 7. A difference between this case and Case 1 is as follows. The first stator 1 is operating, and the second stator 2 is idle. The first field winding (11) and the second field winding (12) are not energized. The magnetic paths of the first permanent magnet (3) and the second permanent magnet (4) are mostly closed through the two air gaps and the two stators, except for a small part closed through the two rotor yokes rather than the air gaps. The magnetic path of the third permanent magnet 5 is basically closed through the first rotor yoke 7, except for a very small part closed through the first air gap 13 and the first stator 1. The magnetic path of the fourth permanent magnet 6 is basically closed through the second rotor yoke 8, except for a very small part closed through the second air gap 14 and the second stator 2. The motor has a large leakage flux, and since only the operating first stator 1 generates a torque, the torque is reduced compared to Case 1 and the power level of the motor is reduced, which is conducive to light-load operation.

Figure 8:
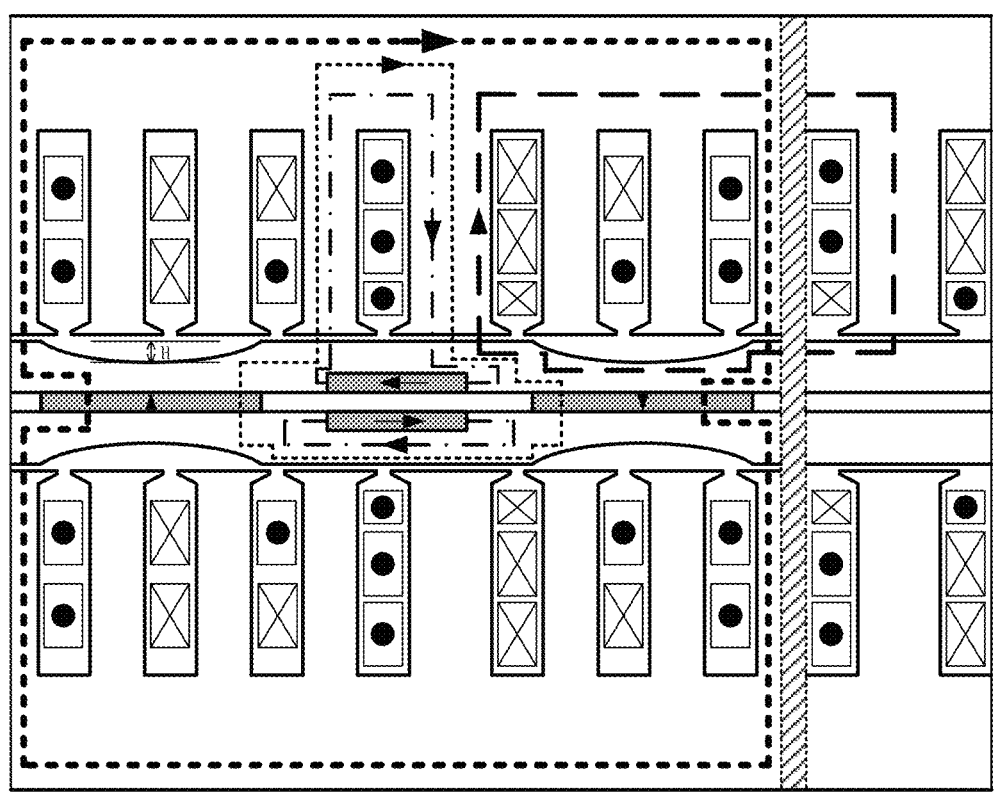
FIG. 8 is a distribution diagram of the magnetic path of the dual-stator axial-flux permanent-magnet motor when only the stator 1 operates and the field winding is energized according to the present disclosure.

Case 4 is shown in FIG. 8. A difference between this case and Case 3 is as follows. The first field winding 11 is energized with a forward current, and its electric excitation magnetic path gradually saturates the leakage magnetic circuit of the first rotor yoke 7. The magnetic paths of the first permanent magnet (3) and the second permanent magnet (4) are mostly closed through the two air gaps and the two stators, except for a small part closed through the first air gap 13, the first stator 1, and the second rotor yoke 8 and basically not through the first rotor yoke 7. The magnetic path of the third permanent magnet 5 is basically closed through the first air gap 13 and the first stator 1. The magnetic path of the fourth permanent magnet 6 is basically closed through the second rotor yoke 8, except for a very small part closed through the second air gap 14 and the second stator 2. Compared to Case 3, in this case, the leakage flux of the motor is reduced, and the torque is increased. Although this increase is limited, it is still conducive to light-load operation.

Figure 9:
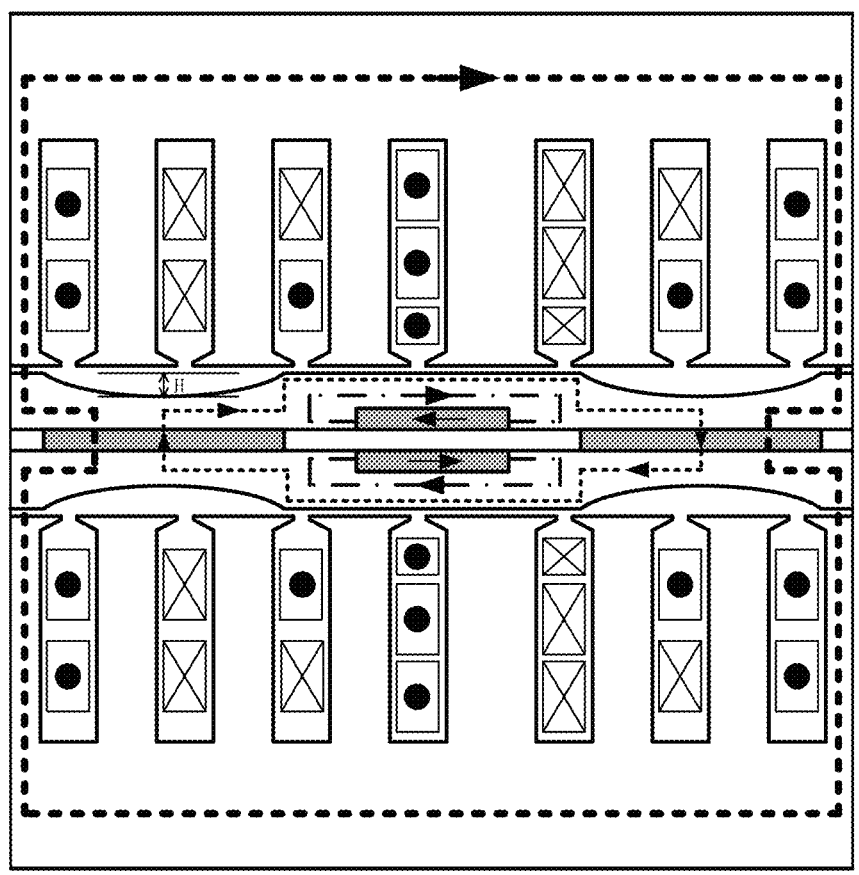
FIG. 9 is a distribution diagram of the magnetic path of the dual-stator axial-flux permanent-magnet motor when only the stator 2 operates and the field winding is not energized according to the present disclosure.

Case 5 is shown in FIG. 9. A difference between this case and Case 3 is as follows. The second stator 2 is operating, and the first stator 1 is idle. The first field winding 11 and the second field winding 12 are not energized. The magnetic paths of the first permanent magnet (3) and the second permanent magnet (4) are mostly closed through the two air gaps and the two stators, except for a small part closed through the two rotor yokes rather than the air gaps. The magnetic path of the third permanent magnet 5 is basically closed through the first rotor yoke 7, except for a very small part closed through the first air gap 13 and the first stator 1. The magnetic path of the fourth permanent magnet 6 is basically closed through the second rotor yoke 8, except for a very small part closed through the second air gap 14 and the second stator 2. The motor has a large leakage flux, and since only the operating second stator 2 generates a torque, the torque is reduced compared to Case 1 and the power level of the motor is reduced, which is conducive to light-load operation.

Figure 10:
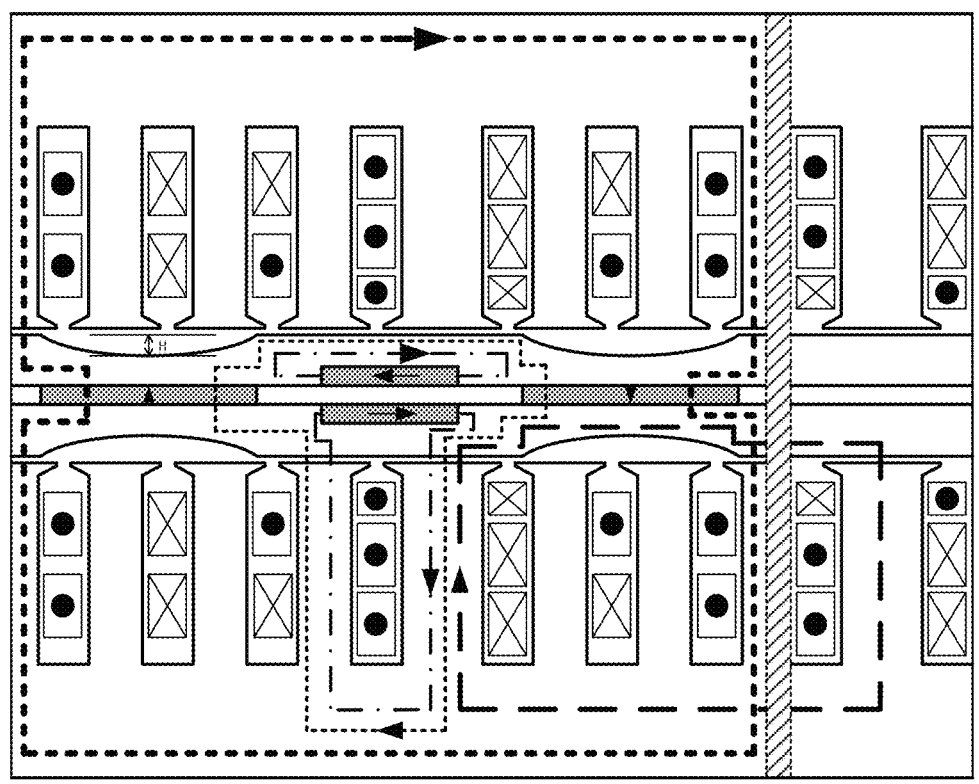
FIG. 10 is a distribution diagram of the magnetic path of the dual-stator axial-flux permanent-magnet motor when only the stator 2 operates and the field winding is energized according to the present disclosure.

Case 6 is shown in FIG. 10. A difference between this case and Case 5 is as follows. The second field winding 12 is energized with a forward current, and its electric excitation magnetic path gradually saturates the leakage magnetic circuit of the second rotor yoke 8. The magnetic paths of the first permanent magnet (3) and the second permanent magnet (4) are mostly closed through the two air gaps and the two stators, except for a small part closed through the second air gap 14, the second stator 2, and the first rotor yoke 7 and basically not through the second rotor yoke 8. The magnetic path of the third permanent magnet 5 is basically closed through the first rotor yoke 7, except for a very small part closed through the first air gap 13 and the first stator 1. The magnetic path of the fourth permanent magnet 6 is basically closed through the second air gap 14 and the second stator 2. Compared to Case 5, in this case, the leakage flux of the motor is decreased, and the torque is increased. Although this increase is limited, it is still conducive to light-load operation.

Figure 11:
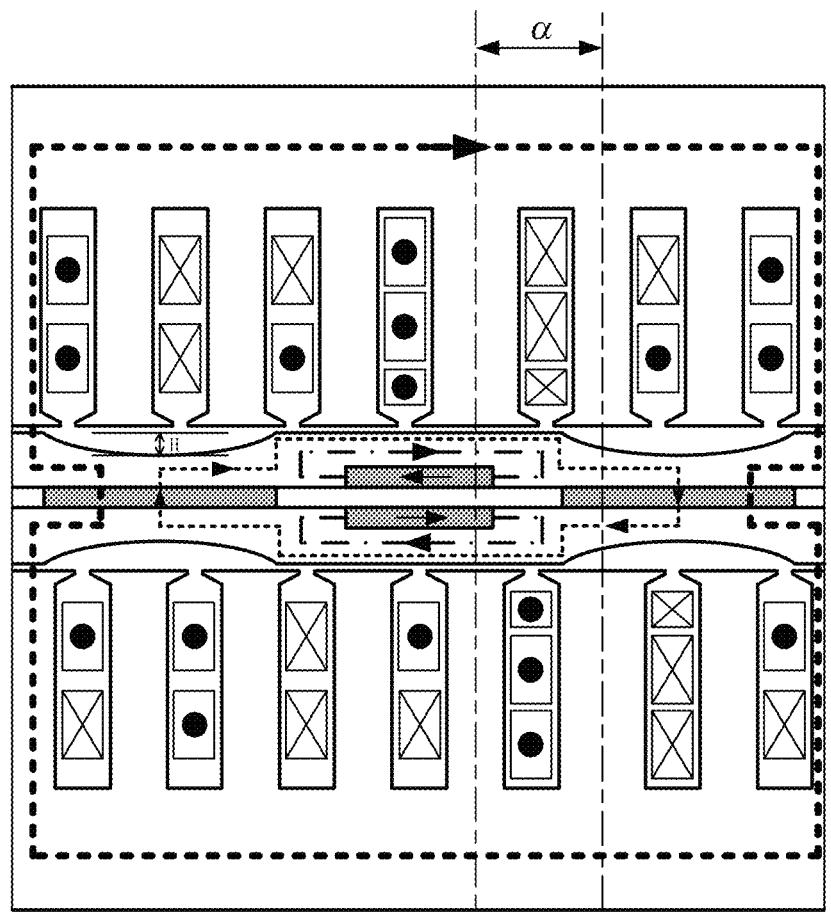
FIG. 11 is a distribution diagram of the magnetic path of the dual-stator axial-flux permanent-magnet motor when the stator 2 is staggered by an angle of α, the stators 1 and 2 operate, and the field winding is not energized according to the present disclosure.

Case 7 is shown in FIG. 11. A difference between this case and Case 1 is as follows. The second stator 2 is misaligned at an angle of α. The magnetic paths of the first permanent magnet (3) and the second permanent magnet (4) are mostly closed through the two air gaps and the two stators, except for a small part closed through the two rotor yokes rather than the air gaps. The magnetic path of the third permanent magnet 5 is basically closed through the first rotor yoke 7, except for a very small part closed through the first air gap 13 and the first stator 1. The magnetic path of the fourth permanent magnet 6 is basically closed through the second rotor yoke 8, except for a very small part closed through the second air gap 14 and the second stator 2. The motor has a large leakage flux, which is basically the same as that in Case 1 and also conducive to light-load operation.

Figure 12:
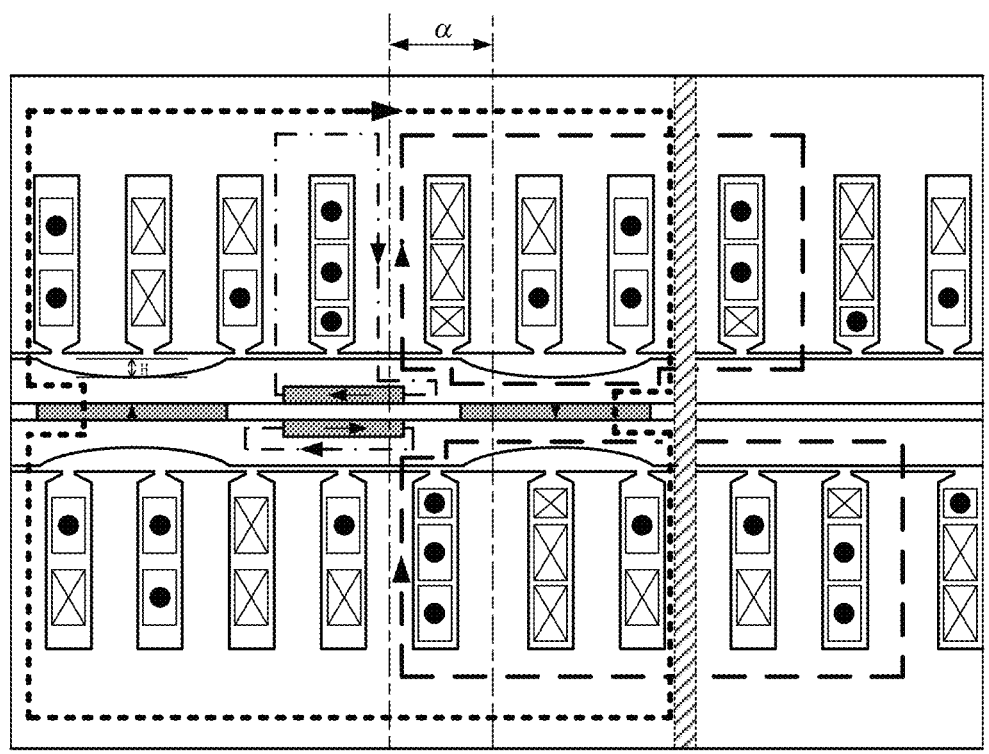
FIG. 12 is a distribution diagram of the magnetic path of the dual-stator axial-flux permanent-magnet motor when the stator 2 is staggered by an angle of α, the stators 1 and 2 operate, and the field winding is energized according to the present disclosure.

Case 8 is shown in FIG. 12. A difference between this case and Case 2 is as follows. The second stator 2 is misaligned at an angle of α. The electric excitation magnetic path of the first field winding 11 gradually saturates the leakage magnetic circuit of the first rotor yoke 7. The electric excitation magnetic path of the second field winding 12 does not pass through the leakage magnetic circuit of the second rotor yoke 8, which weakens the leakage magnetic control effect on the fourth permanent magnet 6. The magnetic paths of the first permanent magnet (3) and the second permanent magnet (4) are basically closed through the two air gaps and the two stators. The magnetic path of the third permanent magnet 5 is mostly transferred from the rotor yoke to the air gap and the stator, and is basically closed through the first air gap 13 and the first stator 1. The magnetic path of the fourth permanent magnet 6 is mostly closed through the second rotor yoke 8, except for a very small part closed through the second air gap 14 and the second stator 2. In this case, the leakage flux of the motor is increased compared to Case 2, and the torque output is slightly decreased, but it is still conducive to heavy-duty operation.

Figure 13:
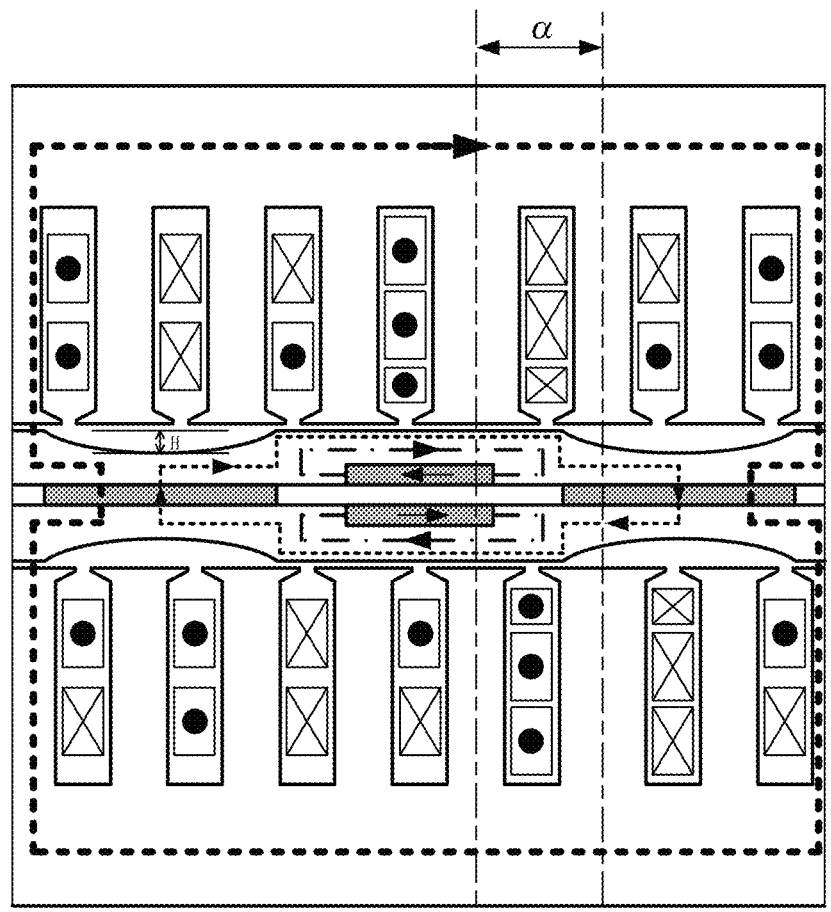
FIG. 13 is a distribution diagram of the magnetic path of the dual-stator axial-flux permanent-magnet motor when the stator 2 is staggered by an angle of α, only the stator 1 operates, and the field winding is not energized according to the present disclosure.

Case 9 is shown in FIG. 13. A difference between this case and Case 3 is as follows. The second stator 2 is misaligned at an angle of α. The first field winding (11) and the second field winding (12) are not energized. The magnetic paths of the first permanent magnet (3) and the second permanent magnet (4) are mostly closed through the two air gaps and the two stators, except for a small part closed through the two rotor yokes rather than the air gaps. The magnetic path of the permanent magnet 5 is basically closed through the first rotor yoke 7, except for a very small part closed through the first air gap 13 and the first stator 1. The magnetic path of the fourth permanent magnet 6 is basically closed through the second rotor yoke 8, except for a very small part closed through the second air gap 14 and the second stator 2. The motor has a large leakage flux, and only the operating first stator 1 generates a torque, which is the same as that in Case 3 and is conducive to light-load operation.

Figure 14:
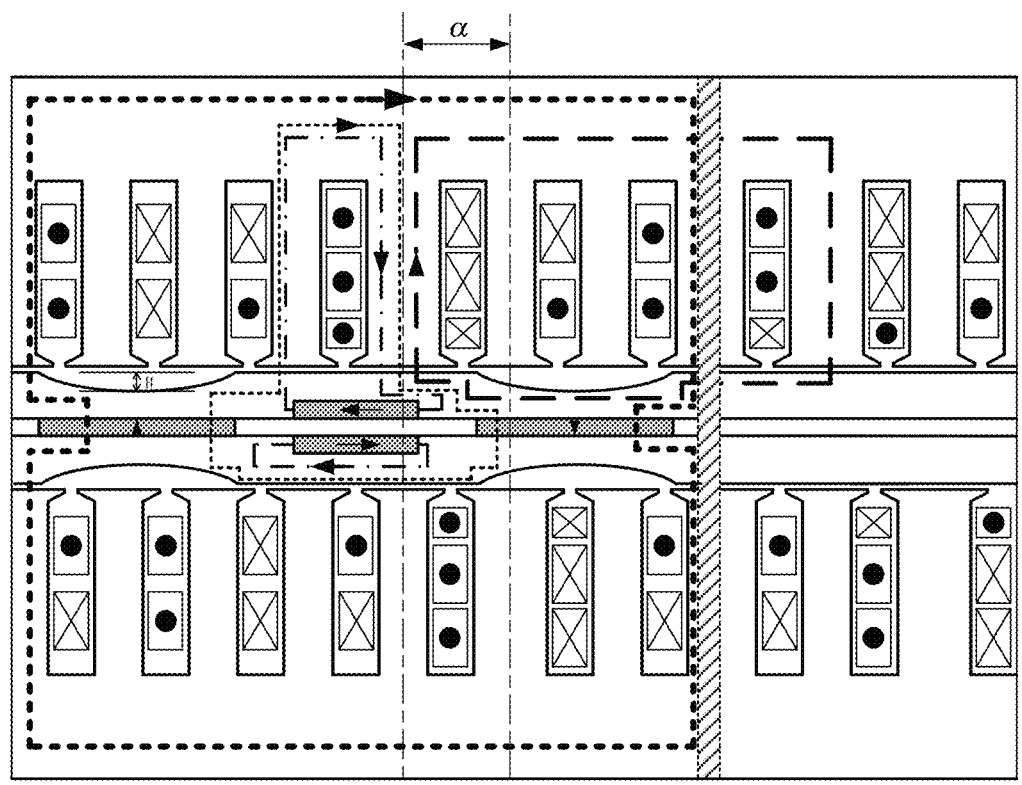
FIG. 14 is a distribution diagram of the magnetic path of the dual-stator axial-flux permanent-magnet motor when the stator 2 is staggered by an angle of α, only the stator 1 operates, and the field winding is energized according to the present disclosure.

Case 10 is shown in FIG. 14. A difference between this case and Case 4 is as follows. The second stator 2 is misaligned at an angle of α. The first field winding 11 is energized with a forward current, and its electric excitation magnetic path gradually saturates the leakage magnetic circuit of the first rotor yoke 7. The magnetic paths of the first permanent magnet (3) and the second permanent magnet (4) are mostly closed through the two air gaps and the two stators, except for a small part closed through the first air gap 13, the first stator 1, and the second rotor yoke 8 and basically not through the first rotor yoke 7. The magnetic path of the third permanent magnet 5 is basically closed through the first air gap 13 and the first stator 1. The magnetic path of the fourth permanent magnet 6 is basically closed through the second rotor yoke 8, except for a very small part closed through the second air gap 14 and the second stator 2. The operating status of the motor is basically the same as that in Case 4, and is conducive to light-load operation.

Figure 15:
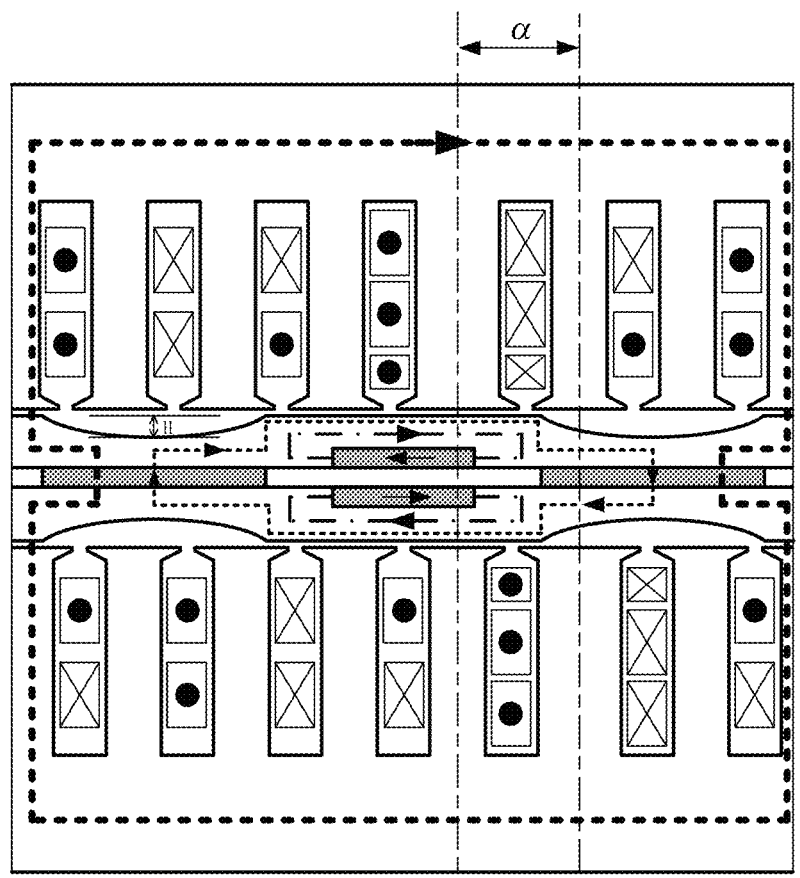
FIG. 15 is a distribution diagram of the magnetic path of the dual-stator axial-flux permanent-magnet motor when the stator 2 is staggered by an angle of α, only the stator 2 operates, and the field winding is not energized according to the present disclosure.

Case 11 is shown in FIG. 15. A difference between this case and Case 5 is as follows. The second stator 2 is misaligned at an angle of α. The first field winding (11) and the second field winding (12) are not energized. The magnetic paths of the first permanent magnet (3) and the second permanent magnet (4) are mostly closed through the two air gaps and the two stators, except for a small part closed through the two rotor yokes rather than the air gaps. The magnetic path of the third permanent magnet 5 is basically closed through the first rotor yoke 7, except for a very small part closed through the first air gap 13 and the first stator 1. The magnetic path of the fourth permanent magnet 6 is basically closed through the second rotor yoke 8, except for a very small part closed through the second air gap 14 and the second stator 2. The motor has a large leakage flux, and only the operating second stator 2 generates a torque, which is the same as that in Case 5 and is conducive to light-load operation.

Figure 16:
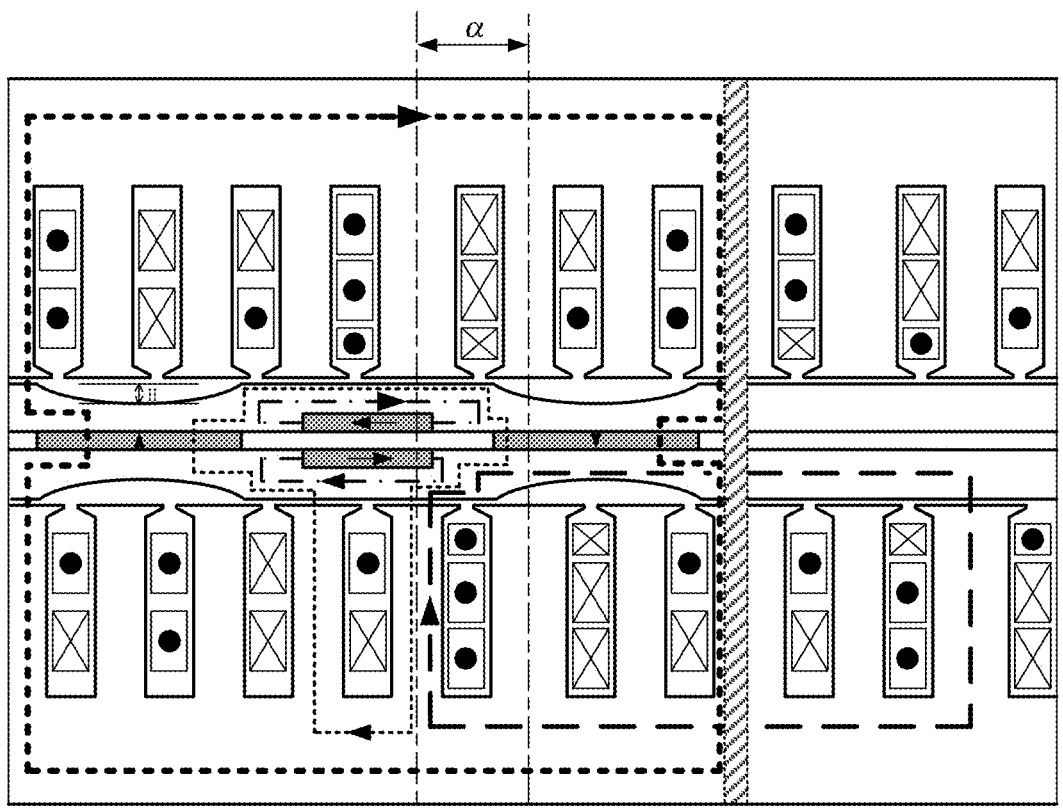
FIG. 16 is a distribution diagram of the magnetic path of the dual-stator axial-flux permanent-magnet motor when the stator 2 is staggered by an angle of α, only the stator 2 operates, and the field winding is energized according to the present disclosure.

Case 12 is shown in FIG. 16. A difference between this case and Case 6 is as follows. The second stator 2 is misaligned at an angle of α. The second field winding 12 is energized with a forward current, but its electric excitation magnetic path does not pass through the leakage magnetic circuit of the second rotor yoke 8, which weakens the leakage magnetic control effect on the fourth permanent magnet (6). The magnetic paths of the first permanent magnet (3) and the second permanent magnet (4) are mostly closed through the two air gaps and the two stators, except for a small part closed through the second air gap 14, the second stator 2, and the first rotor yoke 7 and basically not through the second rotor yoke 8. The magnetic path of the third permanent magnet 5 is basically closed through the first rotor yoke 7, except for a very small part closed through the first air gap 13 and the first stator 1. The magnetic path of the fourth permanent magnet 6 is mostly closed through the second rotor yoke 8, except for a very small part closed through the second air gap 14 and the second stator 2. Compared to Case 11, in this case, the leakage flux of the main magnetic pole of the motor is decreased, while the leakage flux of the auxiliary magnetic pole of the motor remains basically unchanged. The torque is increased, and although this increase is limited, it is still conducive to light-load operation.

Figure 17:
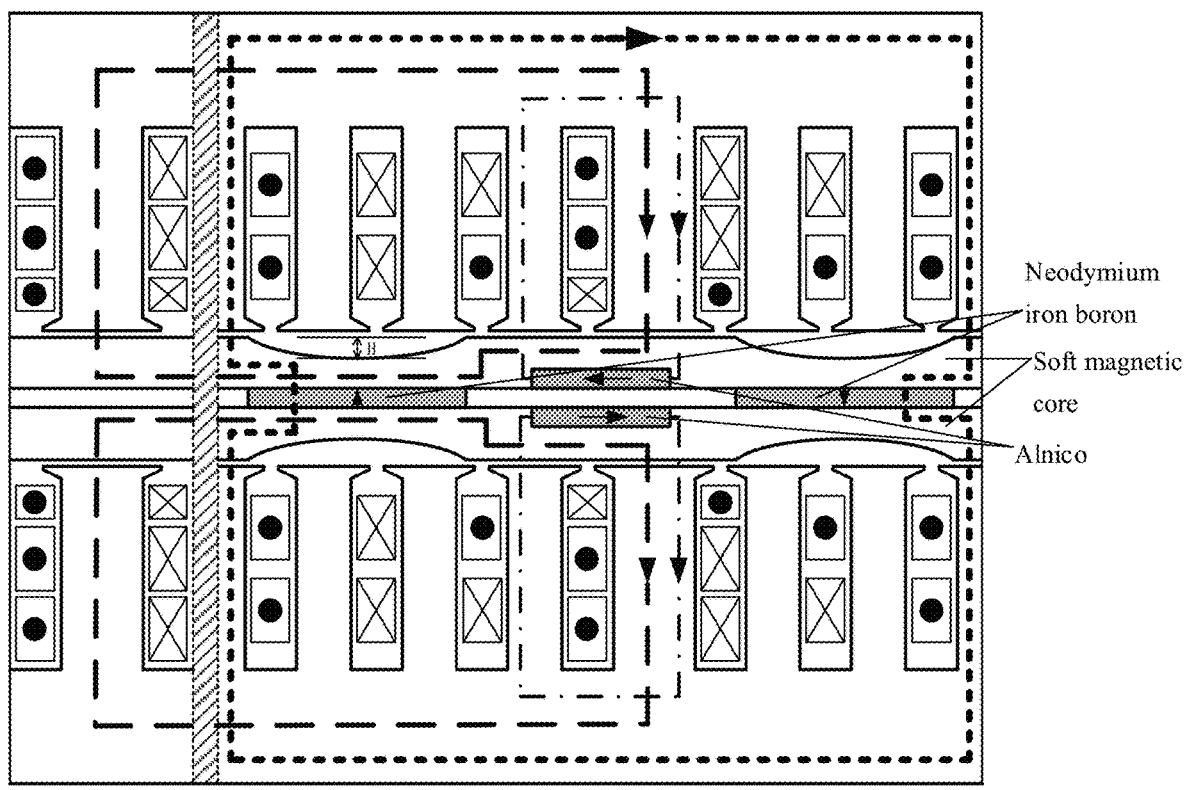
FIG. 17 is a distribution diagram of the magnetic path of the dual-stator axial-flux permanent-magnet motor when permanent magnets 5 and 6 are made of alnico and are in an excitation state according to the present disclosure.

Case 13 is shown in FIG. 17. The first permanent magnet (3) and the second permanent magnet (4) are made of neodymium iron boron, the third permanent magnet (5) and the fourth permanent magnet (6) are made of alnico, and the rotor cores of the first rotor yoke (7) and the second rotor yoke (8) are die-cast from a soft magnetic material. The first field winding (11) and the second field winding (12) are energized with a forward direct current, and the motor is in an excited state. Magnetization levels of the third permanent magnet (5) and the fourth permanent magnet (6) are adjustable by changing the amplitude of the direct current, thereby adjusting the magnetic energy product and air gap flux density of the third permanent magnet (5) and the fourth permanent magnet (6). The first permanent magnet (3) and the second permanent magnet (4) are magnetized in opposite directions along the axial direction of the motor. The magnetic paths of the first permanent magnet and the second permanent magnet are basically closed through the two air gaps and the two stators. The third permanent magnet (5) and the fourth permanent magnet (6) are magnetized in opposite directions along the tangential direction of the motor. The magnetization directions of the third permanent magnet (5) and the fourth permanent magnet (6) are the same as directions of adjustable-flux magnetic fields of the first field winding (11) and the second field winding (12). Greater amplitude of the forward direct current applied to the first field winding (11) and the second field winding (12) indicates a greater magnetic energy product of the third permanent magnet (5) and the fourth permanent magnet (6) and a greater air gap flux density of the motor, until the third permanent magnet (5) and the fourth permanent magnet (6) reach a saturation magnetization state.

Figure 18:
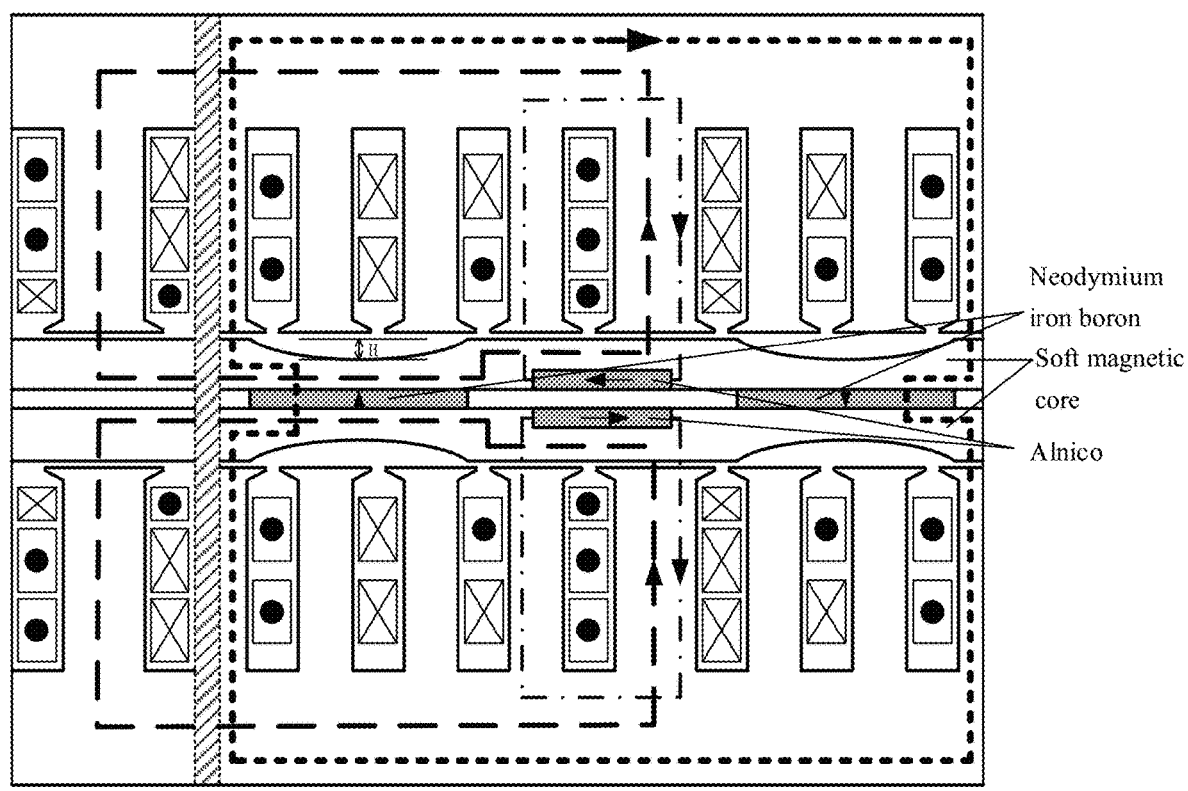
FIG. 18 is a distribution diagram of the magnetic path of the dual-stator axial-flux permanent-magnet motor when the permanent magnets 5 and 6 are made of alnico and are in a flux weakening state according to the present disclosure.

Case 14 is shown in FIG. 18. The first permanent magnet (3) and the second permanent magnet (4) are made of neodymium iron boron, the third permanent magnet (5) and the fourth permanent magnet (6) are made of alnico, and the rotor cores of the first rotor yoke (7) and the second rotor yoke (8) are die-cast from a soft magnetic material. A difference between this case and Case 13 is as follows. The first field winding (11) and the second field winding (12) are energized with a negative direct current, and the motor is in a flux weakening state. The magnetic paths of the first permanent magnet (3) and the second permanent magnet (4) are basically closed through the two air gaps and the two stators. The magnetization directions of the third permanent magnet (5) and the fourth permanent magnet (6) are opposite to the directions of the adjustable-flux magnetic fields of the first field winding (11) and the second field winding (12). Greater amplitude of the negative direct current applied to the first field winding (11) and the second field winding (12) indicates a smaller magnetic energy product of the third permanent magnet (5) and the fourth permanent magnet (6) and a smaller air gap flux density of the motor, until the third permanent magnet (5) and the fourth permanent magnet (6) reach a lowest demagnetization level.

Figure 19:
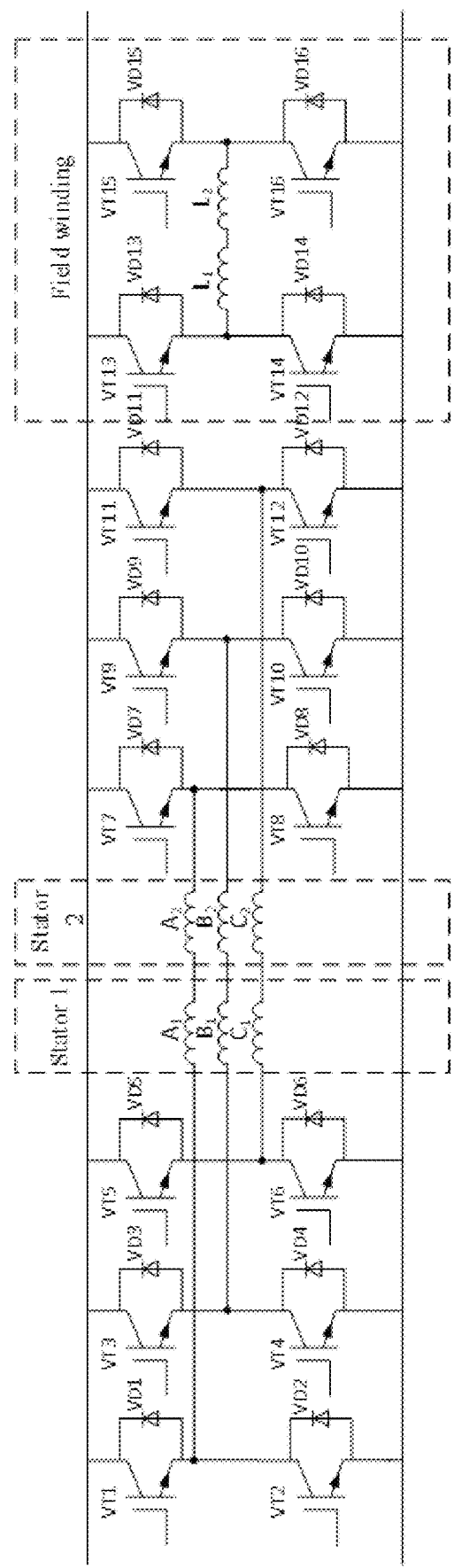
FIG. 19 is a partial control circuit diagram of the dual-stator axial-flux permanent-magnet motor operating in an open winding mode according to the present disclosure.

In the present disclosure, a partial control circuit when the motor operates in an open winding structure mode is shown in FIG. 19. In the figure, the left side shows an inverter control circuit, and the right side shows a field winding control circuit. Most of the current hot research on open winding electric machine (OWEM) systems opens the neutral point of the stator winding of a conventional asynchronous motor or permanent magnet synchronous motor, similar to a conventional motor. Therefore, in order to achieve excellent control performance, it is necessary to study high-performance control strategies for OWEM systems. In addition to the direct torque control used when the OWEM system was first proposed, vector control, maximum torque/current ratio control, flux weakening control, and sensorless technology can also be applied to the OWEM system to achieve better control effects and expand application scenarios.

Figure 20:
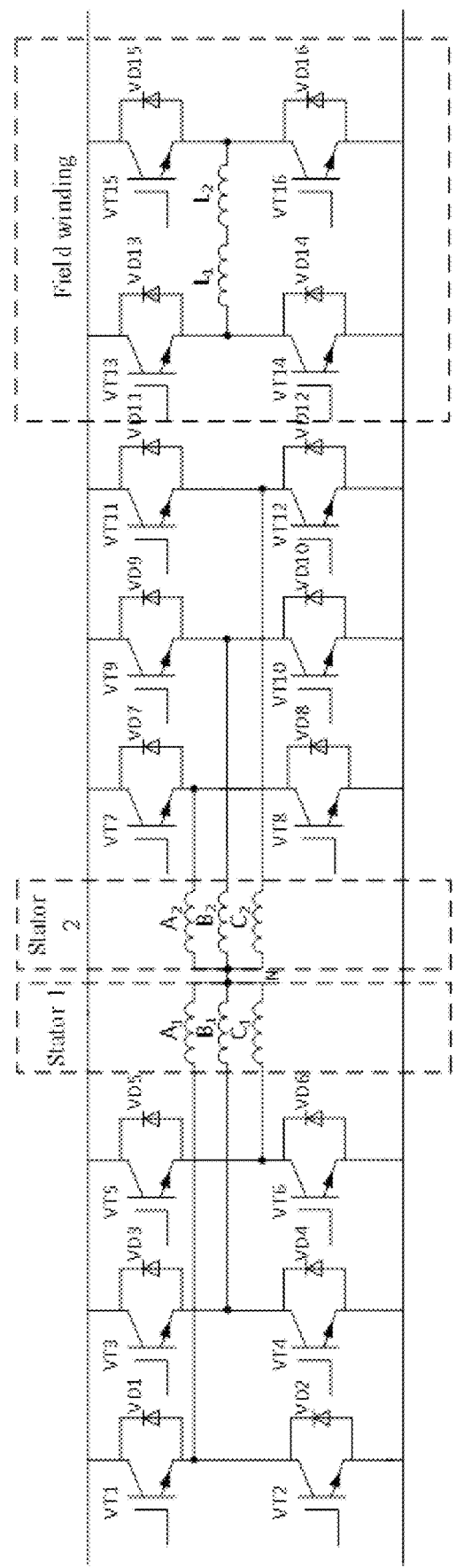
FIG. 20 is a partial control circuit diagram of the dual-stator axial-flux permanent-magnet motor operating in a dual-three-phase mode according to the present disclosure.

In the present disclosure, a partial control circuit when the motor operates in a dual-three-phase structure mode is shown in FIG. 20. Unlike the open winding structure mode, in the dual-three-phase structure mode, the neutral points of two three-phase windings are connected. The control strategy of dual-three-phase motors is basically the same as that of traditional three-phase motors. The main idea is to expand the control solution of three-phase motors to a six-dimensional space, which can be roughly divided into vector control, direct torque control, and model predictive control. Vector control generally maps a voltage space vector in a six-phase stationary coordinate system to three orthogonal two-dimensional sub-planes for analysis, in order to control each sub-plane separately. Direct torque control generally involves vector synthesis of flux linkage of two windings and control of the synthesized flux linkage through a traditional table lookup method applied in three-phase motors. The main idea of model predictive control is to predict the impact of a current voltage vector on the future performance of the system based on a predictive model. By traversing all optional voltage vectors, the optimization problem of the system is solved online in a given time domain, and an optimal voltage space vector is selected and applied to the motor to achieve a desired control effect.

The multi-excitation-source poles-partitioned dual-stator axial-flux controllable permanent-magnet motor of the present disclosure adapts to the requirements of variable operating conditions and can operate in the open winding structure mode and the dual-three-phase structure mode. The air gap field is formed by a permanent magnetic field generated by the main magnetic pole and the auxiliary magnetic pole, an electric excitation magnetic field generated by the field winding, and an armature reaction magnetic field generated by an armature winding. The air gap field can achieve bidirectional adjustment, giving the motor the advantages of high power density and strong heat dissipation ability that traditional axial-flux permanent-magnet motors have, as well as the advantages of wide speed range and low torque ripple.

What is claimed is:

1. A logging method based on a time-domain electromagnetic tensor, wherein the method comprising: A multi-excitation-source poles-partitioned dual-stator axial-flux controllable permanent-magnet motor, comprising a first stator, a second stator, a first permanent magnet, a second permanent magnet, a third permanent magnet, a fourth permanent magnet, a first rotor yoke, a second rotor yoke, a first armature winding, a second armature winding, a first field winding, a second field winding, a first air gap, and a second air gap, wherein the first stator and the second stator are symmetrically provided outside the motor, with respective slots facing inward; the first armature winding is wound on stator teeth of the first stator in a distributed structure; the second armature winding is wound on stator teeth of the second stator in a distributed structure; the first field winding is wound on the stator teeth of the first stator in a centralized structure; the second field winding is wound on the stator teeth of the second stator in a centralized structure; the first rotor yoke and the second rotor yoke are symmetrically provided inside the motor, with respective slots facing inward; a plurality of fan-shaped slots are uniformly distributed inside the first rotor yoke and each are provided therein with the third permanent magnet; a plurality of fan-shaped slots are uniformly distributed inside the second rotor yoke and each are provided therein with the fourth permanent magnet; positions of the fan-shaped slots on the first rotor yoke and the second rotor yoke are completely symmetrical; the first permanent magnet and the second permanent magnet are provided between the first rotor yoke and the second rotor yoke; the first permanent magnet and the second permanent magnet are spaced apart from each other and circumferentially staggered from the third permanent magnet and the fourth permanent magnet; the first air gap is provided between an inner side of the first stator and an outer side of the first rotor yoke; the second air gap is provided between an inner side of the second stator and an outer side of the second rotor yoke; and an axis of the first stator and the second stator coincides with a rotational axis of the first rotor yoke and the second rotor yoke.

2. The multi-excitation-source poles-partitioned dual-stator axial-flux controllable permanent-magnet motor according to claim 1, wherein the first stator and the second stator each comprise a stator core formed by winding a silicon steel sheet circumferentially and the stator teeth formed in a part facing a rotor; the first rotor yoke and the second rotor yoke each comprise a rotor core formed by winding a silicon steel sheet circumferentially; and in a design of the multi-excitation-source poles-partitioned dual-stator axial-flux controllable permanent-magnet motor with high-speed operation, the rotor core of the first rotor yoke and the rotor core of the second rotor yoke are die-cast from a soft magnetic material.

3. The multi-excitation-source poles-partitioned dual-stator axial-flux controllable permanent-magnet motor according to claim 1, wherein the first armature winding and the second armature winding are double-layer windings of a distributed structure, with a pitch of $\geq 360°/(2*p)$, wherein p denotes a number of rotor pole pairs;

the first field winding and the second field winding are single-layer windings with an interval of $120°*Z/(2*p)$, wherein Z denotes a number of stator slots; and 8 of the fan-shaped slots with a depth of 3 mm and a curvature of $0.285*360°/(2*p)$ are uniformly distributed inside the first rotor yoke, with a spacing of $(1-0.285)*360°/(2*p)$ between each two adjacent ones of the fan-shaped slots; and 8 of the fan-shaped slots with a depth of 3 mm and a curvature of $0.285*360°/(2*p)$ are uniformly distributed inside the second rotor yoke, with a spacing of $(1-0.285)*360°/(2*p)$ between each two adjacent ones of the fan-shaped slots.

4. The multi-excitation-source poles-partitioned dual-stator axial-flux controllable permanent-magnet motor according to claim 1, wherein the first permanent magnet and the second permanent magnet each comprise p pole pairs distributed circumferentially and alternately in N and S; the first permanent magnet and the second permanent magnet are magnetized in opposite directions along an axial direction of the motor; the third permanent magnet and the fourth permanent magnet are magnetized in opposite directions along a tangential direction of the motor; a magnetic energy product of the first permanent magnet and the second permanent magnet is greater than a magnetic energy product of the third permanent magnet and the fourth permanent magnet; and the first permanent magnet and the second permanent magnet are spaced $0.55*360°/(2*p)$ apart and circumferentially staggered by $0.1325*360°/(2*p)$ from the third permanent magnet and the fourth permanent magnet; and a magnetic flux generated by the third permanent magnet and the fourth permanent magnet basically does not participate in an excitation of an air gap field in an unloaded state and participates in the excitation of the air gap field in a loaded state, thereby changing a magnetic flux of a main magnetic circuit of the motor and expanding a speed range of the motor; and when the third permanent magnet and the fourth permanent magnet are made of a ductile alnico material, a direct current excitation is applied through the first field winding or the second field winding to adjust the magnetic energy product of the third permanent magnet and the fourth permanent magnet.

5. The multi-excitation-source poles-partitioned dual-stator axial-flux controllable permanent-magnet motor according to claim 1, wherein a hollow heat dissipation hole is provided between rotor cores of the first rotor yoke and the second rotor yoke to reduce a rotor temperature and a risk of permanent magnet demagnetization by means of oil cooling and air cooling; and an arc-shaped groove with a depth of $H \leq 3$ mm is provided at a position axially opposite to the first permanent magnet and the second permanent magnet at an air gap side of the first rotor yoke and the second rotor yoke, to adjust a magnetic flux of the first permanent magnet, the second permanent magnet, the third permanent magnet, and the fourth permanent magnet, and to reduce a cogging torque and an axial magnetic pull of the motor.

6. The multi-excitation-source poles-partitioned dual-stator axial-flux controllable permanent-magnet motor according to claim 1, wherein when the first field winding and the second field winding fail, the first armature winding and the second armature winding operate independently without affecting normal operation of the motor; and when the first armature winding and the second armature winding fail, the first field winding and the second field winding replace the first armature winding and the second armature winding and are energized with a three-phase current to drive the motor to operate, thereby improving fault tolerance and operational reliability of the motor.

7. The multi-excitation-source poles-partitioned dual-stator axial-flux controllable permanent-magnet motor according to claim 1, wherein the first stator and the second stator are staggered by a predetermined angle of $\alpha \leq 120° *Z/(2*p)$; and the angle is controllable to change a leakage flux and an air gap flux density of the motor, thereby changing an output torque and a power level of the motor, wherein p denotes a number of rotor pole pairs and Z denotes a number of stator slots.

8. A variable-condition driving control system of the multi-excitation-source poles-partitioned dual-stator axial-flux controllable permanent-magnet motor according to claim 1, comprising a motor power converter composed of four H-bridges, wherein inlet and outlet terminals of the first field winding and the second field winding are respectively connected to center points of the H-bridges, and inlet and outlet terminals of the two armature windings on the first stator and the second stator are respectively connected to the center points of the H-bridges to form an open winding structure or a dual-three-phase structure; and the H-bridges of the first field winding and the second field winding are connected in series with an open winding structure busbar of three-phase windings.

9. The variable-condition driving control system of the multi-excitation-source poles-partitioned dual-stator axial-flux controllable permanent-magnet motor according to claim 8, wherein a number of the three-phase windings is two, multi-mode operation is achieved; when neutral points of the two three-phase windings on the first stator and the second stator are disconnected, the motor operates in the open winding structure; and when the neutral points of the two three-phase windings on the first stator and the second stator are connected, the motor operates in the dual-three-phase structure.

10. The variable-condition driving control system of the multi-excitation-source poles-partitioned dual-stator axial-flux controllable permanent-magnet motor according to claim 8, wherein the first field winding and the second field winding are controlled separately through one of the H-bridges; on-off of four switch transistors is controllable to control application of forward and backward excitation currents, thereby achieving magnetization and demagnetization of a magnetic field of the motor; and when the field windings fail, a control effect of a power converter of the armature windings is not affected.

\* \* \* \* \*